(12) United States Patent
Mukherjee et al.

(10) Patent No.: US 10,152,221 B2
(45) Date of Patent: Dec. 11, 2018

(54) BANKING SERVICES EXPERIENCE CENTER

(71) Applicant: Wells Fargo India Solutions Private Limited, Hyderabad (IN)

(72) Inventors: Aveek Kumar Mukherjee, Kolkata (IN); Sunil Cherian Korah, Bangalore (IN); Sudheendranath R. Bhatt, Bangalore (IN); Sukesh Krishnamoorthy, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 13 days.

(21) Appl. No.: 15/685,627

(22) Filed: Aug. 24, 2017

(65) Prior Publication Data
US 2017/0351400 A1 Dec. 7, 2017

Related U.S. Application Data

(62) Division of application No. 14/166,033, filed on Jan. 28, 2014, now Pat. No. 9,772,766.

(60) Provisional application No. 61/757,775, filed on Jan. 29, 2013.

(51) Int. Cl.
| | |
|---|---|
| *G06F 3/16* | (2006.01) |
| *G06F 3/0488* | (2013.01) |
| *G06Q 10/10* | (2012.01) |
| *G09B 5/06* | (2006.01) |
| *G09B 19/00* | (2006.01) |
| *G06Q 40/02* | (2012.01) |

(52) U.S. Cl.
CPC ............ *G06F 3/0488* (2013.01); *G06F 3/167* (2013.01); *G06Q 10/103* (2013.01); *G09B 5/065* (2013.01); *G09B 19/00* (2013.01); *G06Q 40/02* (2013.01)

(58) Field of Classification Search
CPC ........ G09B 7/00; G09B 19/00; G06F 17/5009
See application file for complete search history.

(56) References Cited

U.S. PATENT DOCUMENTS

| | | | |
|---|---|---|---|
| 5,774,525 | A | 6/1998 | Kanevsky et al. |
| 6,487,068 | B1 | 11/2002 | Rahemtulla |
| 2001/0052910 | A1 | 12/2001 | Parekh et al. |
| 2005/0282141 | A1 | 12/2005 | Falash et al. |
| 2006/0028556 | A1 | 2/2006 | Bunn et al. |

(Continued)

FOREIGN PATENT DOCUMENTS

WO WO 2006/124391 A2 * 11/2006 ............. G09B 23/28

OTHER PUBLICATIONS

International Search Report and Written Opinion for PCT/IB2014/000721 dated Jul. 30, 2014.*

*Primary Examiner* — Jerry-Daryl Fletcher
(74) *Attorney, Agent, or Firm* — Merchant & Gould P.C.

(57) ABSTRACT

A system for creating an interactive banking experience includes: a facility for housing the interactive banking experience; a first electronic computing device for controlling the interactive banking experience, the interactive banking experience comprising one or more banking workflow scenarios; an environmental control system for creating ambient conditions corresponding to the one or more banking workflow scenarios; and a detection system for detecting gestures and voice commands from a user, the gestures and voice commands being used to activate workflow steps in the one or more banking workflow scenarios.

20 Claims, 11 Drawing Sheets

(56) References Cited

U.S. PATENT DOCUMENTS

2009/0115610 A1    5/2009   Steinhage et al.
2010/0324962 A1   12/2010   Nesler et al.
2011/0188981 A1    8/2011   Bonn et al.
2012/0221380 A1    8/2012   Dissmore et al.

* cited by examiner

BANKING SERVICES EXPERIENCE CENTER

BACKGROUND

Banking processes and technologies can be complex, particularly to someone who is new to the banking field. Conventional methods of teaching banking processes and technologies may include formal classroom instruction, training videos, online instruction and other similar methods. With these conventional methods, there is typically a clear delineation between instructor and student.

An alternate method of teaching is to immerse a student in a learning experience. With an immersive experience, a student may learn as a result of doing, rather than learning by studying. By encouraging learning in a social situation, an immersive experience may be a more effective learning experience than a conventional learning experience.

SUMMARY

Embodiments of the disclosure are directed to systems and methods for a system for creating an interactive banking experience including: a facility for housing the interactive banking experience; one or more electronic computing devices for controlling the interactive banking experience, the interactive banking experience comprising one or more banking workflow scenarios; an environmental control system for creating ambient conditions corresponding to the one or more banking workflow scenarios; and a detection system for detecting gestures and voice commands from a user, the gestures and voice commands being used to activate workflow steps in the one or more banking workflow scenarios.

In another aspect, a method for implementing an interactive banking experience includes: on a first electronic computing device, receiving a request for access authentication for a user of an interactive banking center; determining a profile for the user based upon the access authentication, the profile designating access rights for the interactive banking center; initiating a first workflow in the interactive banking center, the first workflow corresponding to the profile of the user; activating lighting and images corresponding to the first workflow; displaying an interactive image of a first participant in the first workflow; initiating a dialog between the first participant and the first user; receiving responses from the first user; and activating steps in the first workflow based upon the responses.

In yet another aspect, a first electronic computing device includes: a processing unit; and system memory, the system memory including instructions that when executed by the processing unit cause the first electronic computing device to: receive a request for access authentication for a user of an interactive banking center; determine a profile for the user, the profile designating access rights for the interactive banking center; initiate a first workflow in the interactive banking center, the first workflow corresponding to the profile of the user, the first workflow comprising a plurality of steps, the steps being organized in hierarchical levels; activate lighting and images corresponding to the first workflow; activate a step of the first workflow corresponding to an experience level of the user, the experience level being determined from the profile for the user; display an interactive image of a first participant in the first workflow; initiate a dialog between the first participant and the first user; receive responses from the first user, the responses including one or more of verbal responses, gestures and data; activate steps in the first workflow based upon the responses; stop the first workflow based upon a response; display images of data flow during the first workflow when the first workflow is stopped; display an architecture of the first workflow when the first workflow is stopped, the architecture including one or more of application screens, processes, process flow, hardware and network configuration; restart the first workflow based upon a response; and after the first workflow is completed, start a second workflow based upon a response.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for a banking services experience center. In some examples, the banking services experience center provides a game-like immersive learning experience for employees who want to learn business processes, products and technologies of a banking company.

The banking services experience center can improve learning by providing an immersive experience for a user. The banking services experience center is an enclosed facility that simulates an environment of a banking center. The environment is configured to change based upon different workflow scenarios. For example, for a workflow scenario for opening a bank account, the experience center may simulate a bank branch. For a workflow scenario for originating a mortgage, the experience center may simulate a mortgage company office, etc. For a workflow scenario for a bank teller, the experience center may simulate a view from a teller's station.

Rather than remaining stationary at a computer console and be fed information, the user is immersed in the banking experience. For example, for the workflow experience of the user opening an account, the user may actually fill out forms and submit the forms to a simulated teller. For a workflow experience of the bank teller, the user may use a computer console to open a simulated customer's account and make changes to the account.

The banking services experience center permits the user to control the workflow interactively. For example, the user may use a gesturing device (such as a Kinect® game console from Microsoft Corporation) to advance or repeat workflow sequences. At certain stages of a workflow process, a user may stop the workflow and view detailed technology for the workflow and view detailed process views and architecture.

For example, a user may view workflow processes, activity blocks and hardware/software components used during the workflow. The user may also make changes to workflow processes and save these changes. In addition, the user may record workflow sequences and playback the workflow sequences at a later time to enhance learning. For bank employees working on activities they cannot experience physically, the experience center simulates a virtual immersive environment which helps the bank employees get an insight into things they work on and which provides a view of the underlying technologies.

Figure 1:
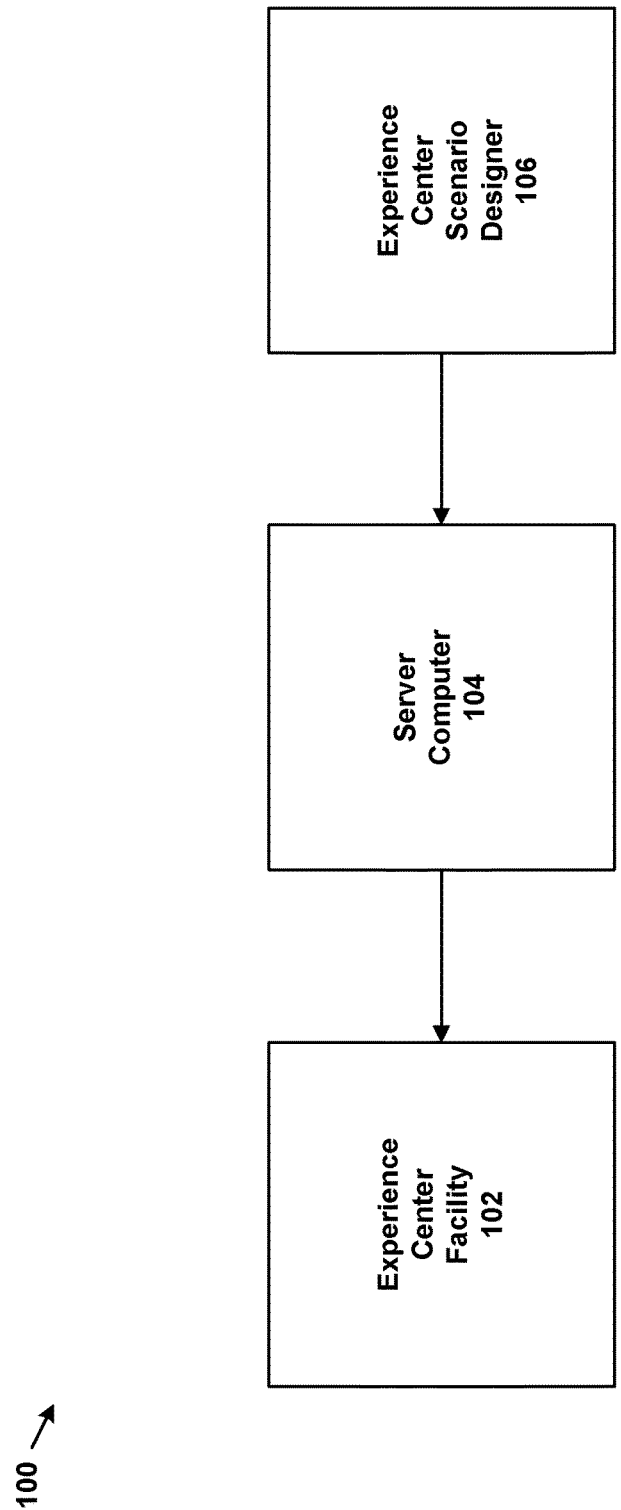
FIG. 1 shows an example system that supports a banking services experience center.

FIG. 1 shows an example system 100 that supports a banking services experience center. The system example system 100 includes an experience center facility 102, a server computer 104 and an experience center scenario designer 106.

The example experience center facility 102 is an enclosed facility, typically a room, which contains audio/visual equipment and other electronics that simulate banking scenarios, as described further below. The experience center facility 102 includes authentication electronics that verifies an identity of the user. For example, experience center facility 102 may include a card reader that authenticates the user. In another example, the experience center facility 102 may include a radio frequency identification (RFID) device that reads an RFID tag of the user.

When the user is authenticated, the environment of the experience center facility 102 changes to reflect a banking workflow scenario configured for a profile for the user that defines the user's level of access. For example, a user's profile may indicate that the user is a bank teller trainee. In this case, the environment of the experience center facility 102 may change to depict a teller's station. In addition, the banking workflow scenario reflects the beginner status of the user. Other user profiles may result in different experience center environments and different banking workflow scenarios. As discussed further herein, the experience center facility 102 provides an interactive training experience for the user.

The example server computer 104 stores core programs used by the experience center facility 102. In some examples, the server computer 104 may include content for a plurality of workflows used in the experience center facility 102. The server computer 104 includes software applications and display views used to implement the workflows. The server computer 104 may also include a repository of business processes used to implement the workflows. Examples of such business processes include depositing a check, completing a loan application, etc. The server computer 104 may auto-generate content and a user interface for the experience center facility 102 from the software applications, business processes and other data. Some of the functionality of the server computer 104 may be implemented by one or more computing devices in the experience center facility 102.

The experience center scenario designer 106 is a design studio for creating views and sequence flows for the workflows used in the experience center facility 102. In some examples, the experience center scenario designer 106 may be implemented on a client computer separate from the experience center facility 102 and the server computer 104. When the views and sequence flows are completed, executable code for the views and sequence flows are transmitted to the server computer 104 to be made available to the experience center facility 102. The executable views and sequence flows together with the software applications and repository of business processes comprise a core engine for the experience center facility 102.

Figure 2:
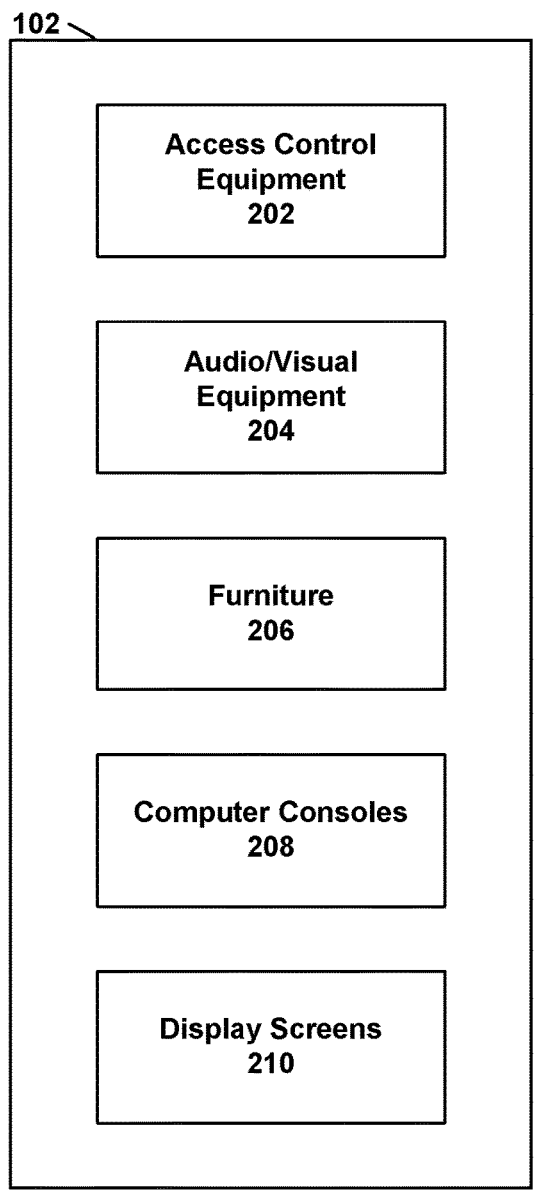
FIG. 2 shows example modules of the experience center facility of FIG. 1.

FIG. 2 shows example modules of the experience center facility 102. The example experience center facility 102 includes access control equipment 202, audio/visual equipment 204, furniture 206, computer consoles 208 and display screens 210. The experience center facility 102 may also include additional equipment not show in FIG. 2.

The example access control equipment 202 authenticates a user before permitting access to the experience center facility 102. The authentication may be via a card reader device, typically placed at an entrance to the experience center facility 102 or via an RFID device that reads a user RFID tag. Other types of access control equipment are possible.

In addition to authenticating the user to permit access for the user, the authentication of the user associates a profile with the user. The profile may include such items as the user's name, job title, access privileges, training history, etc. The profile may determine a type and level of banking training for the user and may also activate an environment in the experience center facility 102 associated with the level of banking training, for example a bank teller environment. The profile may determine a level of information, for example banking records, which may be displayed to the user. In addition, the profile may determine a selection of banking workflows to be used in the experience center facility 102, consistent with the user's job title and training history.

The example audio/visual equipment 204 provides sound, displays and lighting for the experience center facility 102. In some examples, the audio/visual equipment 204 may project one or more images of a workflow environment on one or more walls of the experience center facility 102. For example, the one or more walls may depict various areas of a bank, such as a lobby, a customer's view of a teller's window, a teller's view of the teller window, a loan officer's area, a manager's office, etc. In other examples, parts of the workflow environment may be displayed on one or more display consoles in the experience center facility 102.

The audio/visual equipment 204 may also control lighting in the experience center facility 102 for different environments. For example, lighting in a lobby environment may be brighter than lighting for a teller's station. Different colored lighting may be used as appropriate.

The audio/visual equipment 204 may also include motion sensing equipment and interactive equipment for detecting user gestures and spoken commands. The user gestures and spoken commands may be used to respond to verbal or visual prompts, to advance or repeat workflow sequences, to stop a workflow presentation, to signal a request to display technology data for a workflow presentation, etc. The technology data corresponds to underlying technology and architecture of a banking workflow, such as hardware configurations, processes being used, activity blocks, etc.

The example furniture 206 may include desks, tables, chairs, lamps, etc. that may be used as part of the banking workflows. Other types of furniture or virtualized furniture may be used. The furniture 206 can be customized as part of the room and/or as part of the user experience.

The experience center facility 102 may also include one or more computer consoles 208 and one or more display screens 210. In some examples, the user may use one or more of the computer consoles/devices 208 to enter data during a workflow. For example, for a workflow for a bank customer, the user may fill out forms using one of the computer consoles 208. For a workflow for a bank teller, the user may access and update customer account information using one of the computer consoles 208.

The display screens 210 may include display screens for the computer consoles 208. In addition, other display screens 210 may be external to the computer consoles 208. These other display screens 210 may display an image of a participant in a workflow. For example, for the workflow for the bank customer, one of the display screens 210 may display an image of a bank teller. For the workflow for the bank teller, one of the display screens 210 may display an image of the bank customer. The displayed images may be animated and interactive. For example, when the bank teller image is displayed, the bank teller may talk to the user and give instructions to the user. When the user responds to the instructions, the bank teller may perform one or more actions based upon the user's response.

The display screens 210 may also be used to display images associated with a workflow. For example, one or more of the display screens 210 may be large screens on which an image of a bank, a bank teller station, a mortgage office, etc. is displayed. The images may be projected on the display screens 210 via the audio/visual equipment 204. In addition, technology views, such as workflow architecture, processes, activity blocks, etc. may be displayed on one or more of the display screens 210.

Figure 3:
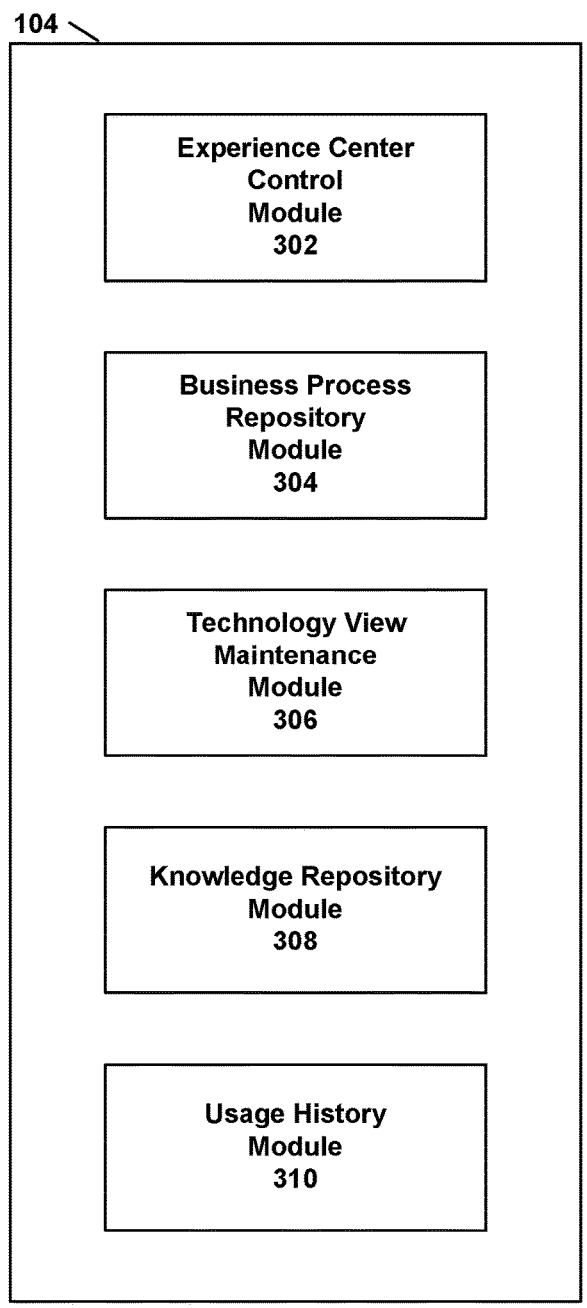
FIG. 3 shows example modules of the server computer of FIG. 1.

FIG. 3 shows example modules of the server computer 104. The example server computer 104 includes an experience center control module 302, a business process repository module 304, a technology view maintenance module 306, a knowledge repository module 308 and a usage history module 310.

The example experience center control module 302 controls activity in the experience center facility 102. In some examples, the experience center control module 302 processes authentication information from the access control equipment 202, authenticates the user and determines a profile for the user. Based upon the user profile, the experience center control module 302 initiates and controls a banking workflow corresponding to the user profile.

As part of the banking workflow, the experience center control module 302 controls the setting of ambient conditions in the experience center facility 102 and controls the display or projection of images associated with the banking workflow. The experience center control module 302 also responds to equipment that senses user gestures and verbal commands to activate appropriate steps of the banking workflow specified by the user gestures and verbal commands.

The example business process repository module 304 includes a repository of business processes used by banking services. For example, the business process repository module 304 includes processes for originating a mortgage, for opening a bank account, for changing a credit limit, etc. In addition, the business process repository module 304 includes workflows associated with the banking services, for example a workflow associated with originating a mortgage. The workflow associated with originating a mortgage comprises steps or sequence flows used during the workflow for originating a mortgage.

The business process repository module 304 implements a business view and a process view. The business view implements functionalities of different banking services and permits the user to perform an activity or a transaction for these banking services as a customer. For example, the user may perform activities and transactions as a customer for business products such as an automated teller machine (ATM), online banking, service at a bank branch, etc.

The process view provides a detailed walkthrough of each activity and transaction for the business products. For example, banking processes may be explained for such activities as cash withdrawal from an ATM and viewing balance in online banking. Other activities are possible.

The business view permits the user to navigate through a roadmap of selected processes, similar to a journey through a destination. The navigation is typically 3-dimensional. For example, one or more 3-dimensional tunnels may be displayed from which the user may journey through a process. The user may make decisions and take various branches during the process. Decisions and conditions involved for each selection in a process flow are explained. The process flow may be paused at a tunnel to provide a description of a process step during the process flow.

The business process repository module 304 may also implement role playing in which the user may switch roles during a workflow scenario. For example, a customer visiting a bank branch or store to complete a transaction may be able to switch from a customer to a teller to view and process a transaction. As another example, if a transaction requires a manager's approval, then a teller routes the transaction to the manager and the user is able to switch to the role of a manager. Other role playing scenarios are possible.

The example technology view maintenance module 306 includes component blocks of workflows, such as applications, components, infrastructure, activity blocks, predefined functions, flowcharts, etc. Selected users may have access to the technology view maintenance module 306 to create or modify the applications, components, processes, activity blocks, predefined functions and flowcharts. For example, an authorized programmer or an experience center scenario designer typically has access to the technology view maintenance module 306. In addition, when a user of the experience center facility 102 requests a display of technology associated with a workflow, a request is made to the technology view maintenance module 306. The technology view maintenance module 306 may also include details of an architecture of the experience center system 100. For example, the technology view maintenance module may show a detailed view of the workflow processes and show documents associated with each process and with steps of a workflow.

The technology view maintenance module 306 provides an insight into different technologies used in implementing a banking services process. A technology view takes the user through the data flow, layers of technology and databases, etc. used in a process. A 3-dimensional navigation process and description of respective technologies is provided. The user is able to understand backend technology processes and the interaction between different systems.

The example knowledge repository module 308 includes technology data and business process data that are used with the experience center facility 102. In some examples, the business process repository module 304 includes a subset of processes stored in the knowledge repository module 308. In some examples, the knowledge repository module 308 may be located external to the server computer 104.

The example usage history module 310 stores recordings of user sessions in the experience center facility 102. Typically each user session is recorded. The recording includes all dialogs between the user and a simulated participant in the experience center facility 102. For example, if the banking workflow is for a banking customer, the simulated participant is a bank teller. If the banking workflow is for a bank teller, the simulated participant is the bank customer. The simulated participant is represented by an animated image on one of the display screens 210.

The usage history module 310 also stores all data entered by the user and by the simulated participant during a banking workflow. The usage history module 310 also permits playback of the recorded banking workflow session for the user.

The modules 302, 304, 306, 308 and 310 described herein permit the user to be immersed in a banking workflow. In addition, the server computer 104 may contain additional modules oriented to a specific banking scenario. For example, an ATM module permits the user to experience workflow operations involving an ATM and an online banking module permits the user to experience workflow operations involving online banking. Other modules related to other workflow operations are possible. For each module, the user may be able to explore the functionality of the module and adjust workflows of a module.

In an example implementation involving an ATM, the user may select whether the ATM is a drive-in ATM or a walk-in ATM. Upon selection of a type of ATM, a map of the United States may be displayed on one or more of the display screens 210. The map may list ATMs available in one or more states. The user may choose any state to access an ATM in the selected state. Upon selection of a state, 3-dimensional maps may be displayed showing a city and street view in a tile format. Upon selection of a particular street, the user may be able to see a front view of the ATM. Upon selection of an ATM or upon zooming in on an ATM, the user may be able to initiate and view transactions at the ATM.

In an example implementation involving online banking, the user may be able to initiate online banking from a home or an office. Upon selection of a home, a room with a desk and laptop may be displayed on one or more of the display screens 210. Upon selection of an office, a floor with cubicles and a view showing one or more workstations, desktops and laptop computers may be displayed on one or more of the display screens 210.

Figure 4:
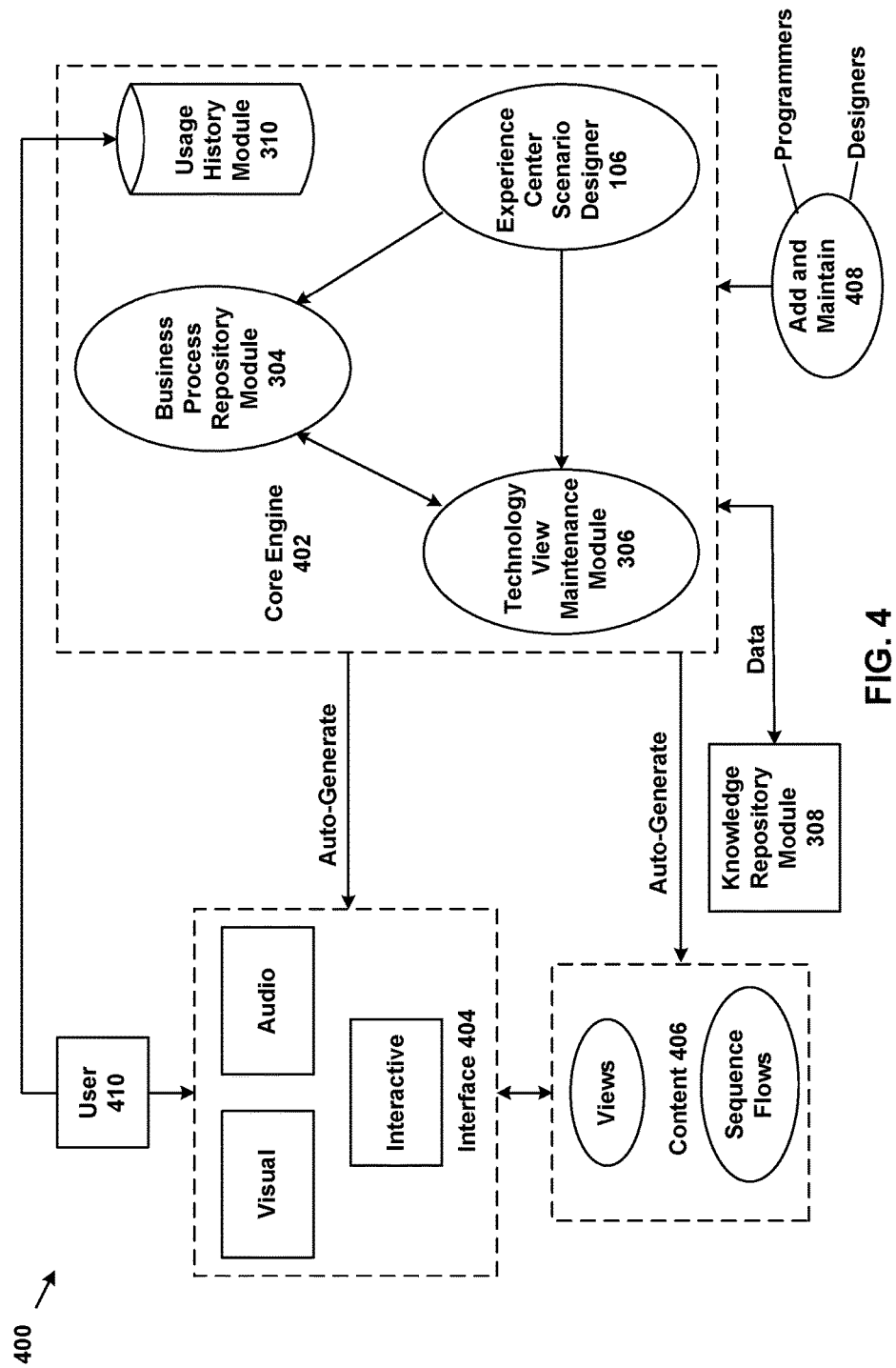
FIG. 4 shows an example framework of the banking services experience center of FIG. 1.

FIG. 4 shows an example framework 400 of the experience center system 100. The framework 400 shows a structure of the experience center system 100. The example framework 400 includes a core engine 402, an interface 404, content block 406, add and maintain block 408 and a user 410.

The example core engine 402 comprises major building blocks of the experience center system 100. The core engine 402 includes the business process repository module 304, the technology view maintenance module 306, the experience center scenario designer 106 and the usage history module 310. When a user 410 is authenticated in the experience center facility 102 and a profile is established for the user 410, the core engine 402 provides the experience center views and processes needed to implement a banking workflow corresponding to the user profile. In some examples, the core engine 402 auto-generates the views, processes and other technology needed to implement the banking workflow. The core engine 402 provides the views, processes and other technology to interface 404 and content block 406. The views, processes and other technology are auto-generated via interaction between the experience center scenario designer 106, the business process repository module 304 and the technology view maintenance module 306.

The interface 404 is a user interface that provides an audio, visual and interactive experience for the user 410. The interface 404 provides the lighting, sounds and images to help implement the banking workflow corresponding to the user profile and to provide ambient conditions corresponding to the banking workflow. In addition, the interface includes equipment to provide an interactive experience for the user. The equipment permits processing of verbal commands by the user and the detection of gestures by the user. The verbal commands and the gestures, by themselves or in combination provide responses to instructions as part of the banking workflow and permit activation of next or previous steps of the banking workflow.

The content block 406 provides the views and sequence flows needed to implement the banking workflow. The views and sequence flows needed to implement the banking workflow are auto-generated by the core engine 402 and sent to the content block 406.

The experience center scenario designer 106 may be periodically updated, typically by programmers and scenario designers. The add and maintain block 408 provides an interface to the experience center scenario designer 106 for the programmers and scenario designers.

The framework 400 also permits knowledge and workflow scenarios to be stored for future use. The knowledge and workflow scenarios are stored in the knowledge repository module 308. Once the knowledge and workflow scenarios are stored in the knowledge repository module 308, the knowledge and workflow scenarios can be accessed and updated via authorized bank employees. The authorized bank employees and other authorized individuals can contribute their knowledge, similar to a Wikipedia web page.

The experience center facility 102 also provides notifications to the user. For example, the user is notified about time elapsed and time remaining on a main display screen in the experience center facility 102. When 5 minutes remain, the user's knowledge and workflow scenarios are automatically saved in the user's database. The experience center experience stops at the scheduled time. The user may load the saved knowledge and workflow scenarios at a next visit to the experience center facility 102 and continue to use the experience center facility 102.

The experience center facility 102 also permits capture of user experience feedback. For example, the user may provide feedback at a kiosk in the experience center facility 102. The user is prompted to provide feedback on the overall experience. The user may enter a rating from 1 to 5. In addition, any textual feedback from the user is captured. Feedback with ratings between 3 and 5 are automatically selected and averaged to determine an average rating for modules and scenarios. In addition, testimonials from the users and other feedback are saved.

Figure 5:
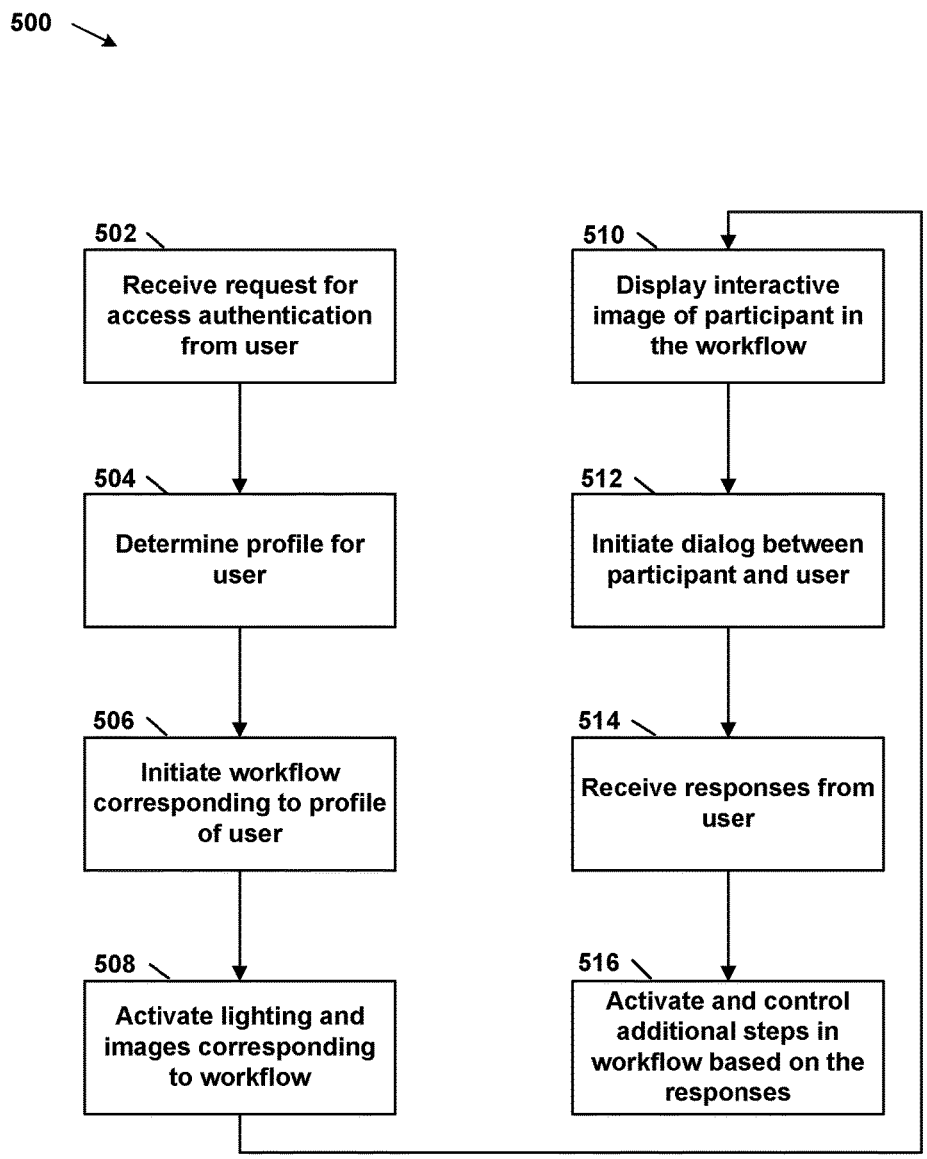
FIG. 5 shows a flowchart for a method for activating steps in a banking workflow scenario.

FIG. 5 shows a flowchart 500 for a method for activating steps in a banking workflow scenario. At operation 502, a request is received at a computing device from a user for access authentication to an interactive experience center facility, for example to experience center facility 102. The computing device may be a server computer, for example server computer 104, that is located in the experience center or that is connected to the experience center. The access authentication may be from a device such as a card reader, from an RFID tag device or some another authentication device.

At operation 504, a profile is determined for the user. The profile is based upon an identity of the user as determined by the access authentication. The profile determines what level of banking training is appropriate for the user. The profile also indicates any previous banking training experiences the user may have had.

At operation 506, a banking workflow is initiated for the user, driven by user preference. The particular banking workflow corresponds to the profile of the user. Depending on the profile and the particular banking workflow, the banking workflow may start at the beginning or may start at an intermediate step in the workflow. For example, if the profile indicates that the user is experienced in one or more areas of the workflow, introductory or basic workflow steps at the beginning of the workflow may be skipped.

At operation 508, lighting and images corresponding to the banking workflow are activated. The lighting and images are activated to simulate ambient conditions for the banking workflow. For example, the images may depict a bank lobby, a teller station, a mortgage office, or similar banking location. The color and intensity of the lighting are set to be appropriate for the ambient conditions. In some examples, the images may be projected on one or more walls of the experience center facility. In other examples, the images may be displayed on one more display screens in the experience center facility.

At operation 510, an interactive image of a participant in the workflow is displayed. The participant is typically a person that is associated with the user in the banking workflow. For example, when the user is bank customer, the participant may be a bank teller or a loan officer. When the user is a bank teller or a loan officer, the participant may be the bank customer. The image is typically displayed on a display screen in the experience center facility. In some examples, the display screen may be part of computer console that the user interacts with in the experience center facility during the banking workflow. The image is animated, typically by a client or server computer, during the banking workflow as part of the steps of the workflow and as part of responses by the user during the banking workflow. In some examples, the image may be an animation or the image may be a frame of a video of an actual person.

At operation 512, a dialog is initiated between the participant and the user. In some examples, based upon the banking workflow, the participant, for example as a simulated banking customer, may communicate that that participant wants to deposit money in a checking account. When the user is a bank teller, a display screen, typically at a computer console of the user, may display the deposit slip. The user may use the computer console to access the participant's bank account and to enter a deposit into the checking account. The user is able to view the participant's bank account on the computer console.

At operation 514, one or more responses are received from the user. For example, for the banking workflow for the bank teller, the user may hand the participant a receipt for the deposit and ask the participant whether there will be any additional transactions. The user may respond verbally to indicate whether there will be any additional responses. Alternately, the user may use hand gestures to advance the banking workflow to a next step in the banking workflow.

At operation 516, additional steps in the banking workflow are activated and controlled based upon the responses. For example, when the user as a bank teller asks the participant for identification, the workflow may advance to a step for providing identification. When a user response, either verbally, via a console or via a gesture directs the workflow to be stopped and directs a technology view to be displayed, one or more technology views may be displayed. The technology views may include such views as a flowchart of the banking workflow, processes and activity blocks used in the banking workflow and hardware components used in the banking workflow.

Figure 6:
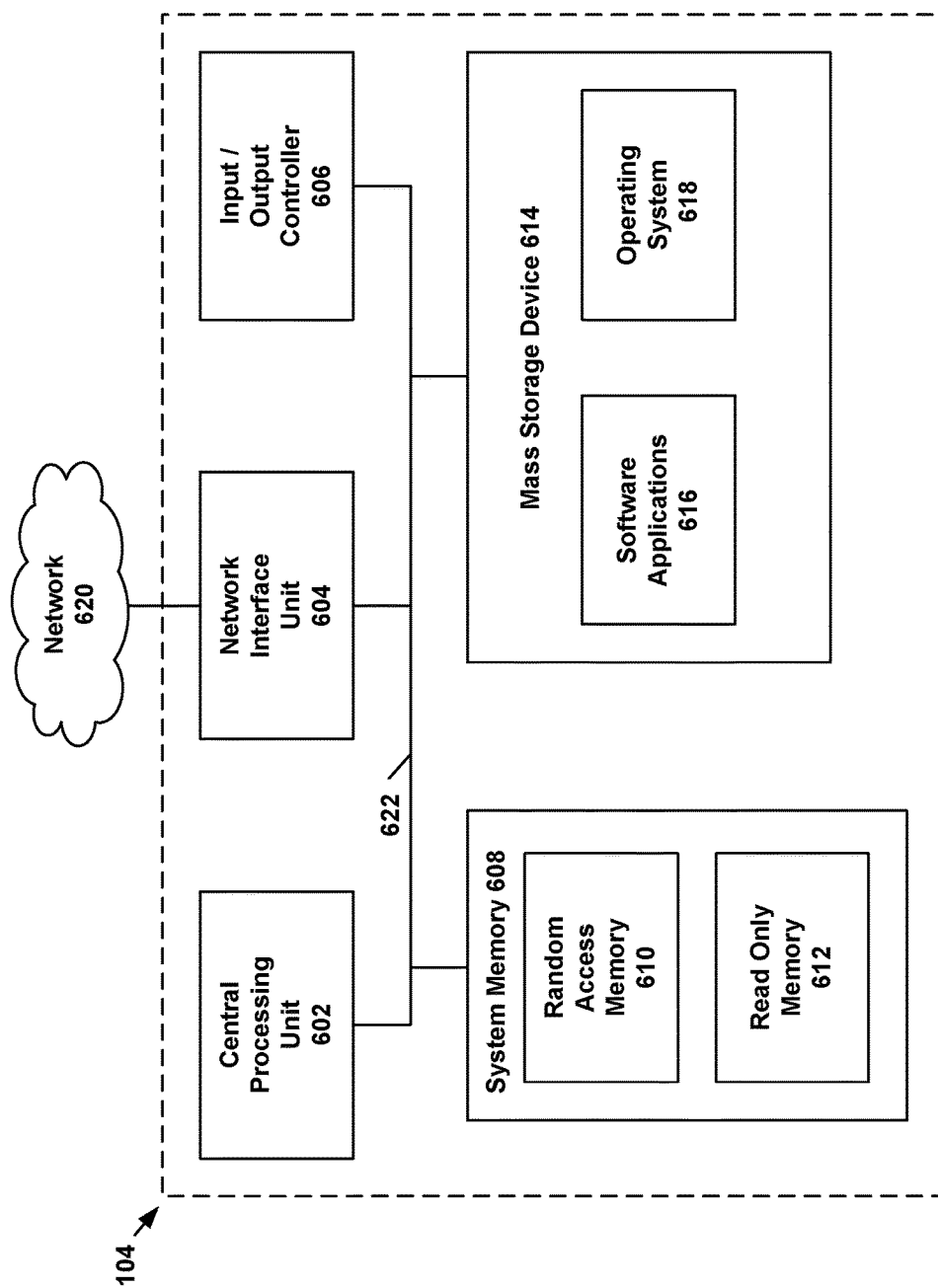
FIG. 6 shows example physical components of the server computer of FIG. 1.

As illustrated in the example of FIG. 6, the server computer 104 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system contains the basic routines that help to transfer information between elements within the server computer 104, such as during startup, is stored in the ROM 612. The server computer 104 further includes a mass storage device 614. The mass storage device 614 is able to store software instructions and data.

The mass storage device 614 is connected to the CPU 602 through a mass storage controller (not shown) connected to the system bus 622. The mass storage device 614 and its associated computer-readable data storage media provide non-volatile, non-transitory storage for the server computer 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 104.

According to various embodiments of the invention, the server computer 104 may operate in a networked environment using logical connections to remote network devices through the network 620, such as a local network, the Internet, or another type of network. The server computer 104 may connect to the network 620 through a network interface unit 604 connected to the system bus 622. It should be appreciated that the network interface unit 604 may also be utilized to connect to other types of networks and remote computing systems. The server computer 104 also includes an input/output controller 606 for receiving and processing input from a number of other devices, including a keyboard, a mouse, a touch user interface display screen, or another type of input device. Similarly, the input/output controller 606 may provide output to a touch user interface display screen, a printer, or other type of output device.

As mentioned briefly above, the mass storage device 614 and the RAM 610 of the server computer 104 can store software instructions and data. The software instructions include an operating system 618 suitable for controlling the operation of the server computer 104. The mass storage device 614 and/or the RAM 610 also store software instructions, that when executed by the CPU 602, cause the server computer 104 to provide the functionality of the server computer 104 discussed in this document. For example, the mass storage device 614 and/or the RAM 610 can store software instructions that, when executed by the CPU 602, cause the server computer 104 to display received physiological data on the display screen of the server computer 104.

Figure 7:
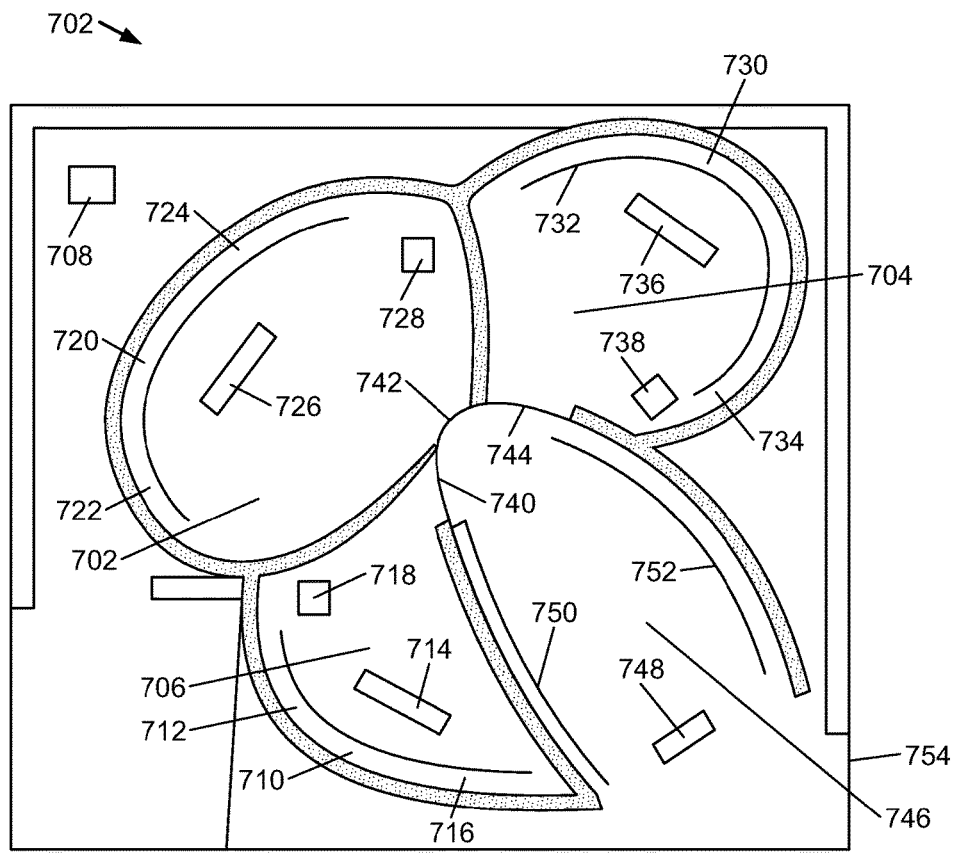
FIG. 7 shows an example physical configuration for the experience center facility of FIG. 1.

FIG. 7 shows an example physical configuration for the experience center facility 102. The example physical configuration shown in FIG. 7 includes three zones 702, 704 and 706. Each zone comprises an enclosed area in which experience center activities take place. In the example experience center facility 102 shown in FIG. 7, zone 702 is a large room that typically supports a plurality of users, whereas zones 704 and 706 are smaller rooms that typically support one or two users. Zone 702 is typically used for group learning, with an instructor, for example for a group of new employees to learn and understand banking processes. In other implementations, more or fewer zones may be used and the zones may be of different sizes than shown in FIG. 7. The shape of each room is curved to enhance a feeling of immersion for participants in the experience center facility 102.

Each zone shown in FIG. 7 includes a projection screen, an interactive display screen, an interactive surface computer and a base station computer. For example, zone 702 includes example projection screens 722 and 724, interactive display screen 720, interactive surface computer 726 and base station computer 728. Example zone 704 includes projection screens 732 and 734, interactive display screen 730, interactive surface computer 736 and base station computer 738. Example zone 706 includes projection screens 716 and 712, interactive display screen 710, interactive surface computer 714 and base station computer 718.

The projection screens 722, 724, 732, 734, 716 and 712 are examples of display screens 210. As discussed earlier herein, display screens 210 are used to display an image of a participant in a workflow and to display images associated with the workflow. In addition, technology views such as workflow architecture, processes, activity blocks, etc. may be displayed on one or more of the display screens 210.

The projection screens 722, 724, 732, 734, 716 and 712 are typically wall mounted in zones 702, 704 and 706. Each projection screen is comprised of a plurality of panels mounted to a wall in zones 702, 704, 706. In an example implementation, a plurality of 8-inch square shaped panels may be used. For example each projection screen may comprise a total of 12 panels in a 4×3 arrangement. This configuration provides a 92-inch diagonal display. In other implementations, more, fewer or different size panels may be used. The projection screens are curved to enhance an immersion experience.

In an example implementation, each panel is a square shaped tile that uses laser phosphor display (LPD) technology. LPD uses lasers to activate phosphors on each tile that create images. LPD typically requires less electricity and has longer life and less maintenance requirements than alternate technologies such as liquid crystal display (LCD) and light emitting diode (LED).

The example interactive display screens 720, 730 and 710 are also projection screens, similar to projection screens 722, 724, 732, 734, 716 and 712. In example implementations, interactive display screens 720, 730 and 710 are also constructed with panels using LPD technology. However, interactive display screens 720, 730 and 710 are used in conjunction with an interactive motion sensor such as the Kinect® game console. In an example implementation, an interactive motion sensor is located in front of each of interactive display screens 720, 730 and 710. User gestures are interpreted by the interactive motion sensors and user images may be displayed on the interactive display screens 720, 730 and 710.

Server computer 708 provides content management for the experience center facility 102. In some implementations, server computer 708 has the same functionality as server computer 104, discussed earlier herein. In other implementations, server computer 708 may have different functionality than server computer 104. In some implementations, server computer 708 may be located external to the experience center facility 102.

Base station computers 728, 738 and 718 are typically gaming personal computers that host core experience center facility applications. The base station computers 728, 738, 718 typically download content from server computer 708. Server computer 708 is typically located external to zones 702, 704 and 706 in experience center facility 102. In some implementations, base station computers 728, 738 and 718 are located in zones 702, 704 and 706, respectively. In other implementations base station computers 728, 738 and 718 may be located external to zones 702, 704 and 706, near server computer 708. The base station computers 728, 738, 718 include sufficient memory and processor speed to support game-type applications used in the experience center facility 102.

The interactive surface computers 726, 736 and 714 are touch screen computers that are typically horizontally mounted on stands facing interactive display screens 720, 730 and 710, respectively. The interactive surface computers 726, 736 and 714 are companion devices to base station computers 728, 738 and 718, respectively, and permit participants to enter data during the interactive workflows described earlier in this disclosure. The base station computers 728, 738 and 718 and the interactive surface computers 726, 736 and 714, in conjunction with the interactive display screens 720, 730 and 710, permit implementation of the interactive workflows.

The experience center facility 102 shown in FIG. 7 also includes a social area 746. The example social area 746 is a room in the experience center facility 102 in which participants may check-in to the experience center facility 102, socialize with other participants, relax and wait until they can enter a zone assigned to them. The participants may check-in to the experience center facility 102 using an example kiosk 748 in the social area 746. An example glass door 754 provides entrance to the social area 746 from outside of the experience center facility 102.

The social area 746 also includes projection screens 750 and 752. The projection screens are typically light emitting diode (LED) displays that are wall mounted in social area 746. Various images may be displayed on the projection screens 750 and 752. The intent of the images is to provide a welcoming experience for the participants, to display informative content to the participants and to create a positive mood for the participants prior to entering a zone. Ambient lighting may also be used to set a mood for the participants.

The social area 746 also includes three doors 740, 742 and 744 to provide entrance into zones 702, 704 and 706, respectively. In addition, floor lighting (see, e.g., floor LEDs 802 shown in FIG. 8) is provided in social area 746. In some implementations when it is time for participants to enter a zone, the floor lighting directs the participants to an assigned zone, for example zone 702, 704 or 706. When the participants approach the door to the assigned zone, the door automatically opens, permitting the participants to enter.

Typically, a user checks into the experience center facility 102 at the kiosk 748 and waits in social area 746 to enter an assigned zone. While waiting in the social area 746, the display tiles in the social area 746 may be used to educate the user and acclimate the user to the experience center facility 102. The display tiles may display a scheduled queue of users, including the name and scheduled time for the users and time left before the users may enter an assigned zone. In some implementations, at two minutes before the scheduled time the user receives visual and voice instruction indicating that the experience is about to start. For example, the user's name may be highlighted and flash on the display tiles and the user's name may be called out.

The display tiles may also notify the user about the scenarios and modules that the user is about to experience in the experience center facility 102 and about other scenarios and modules from a catalogue of scenarios and modules. In addition, the display tiles may also be used to acclimate the user with modules, gestures and other technology gadgets that may be used in the experience center facility 102.

The user may perform transactions using gestures that are commonly used across all experience center views. Some gestures that may be used include swiping, pushing, turning and making a fist. For example, the user may swipe an arm across a display screen to change a view on the display screen to a next view or go back to a previous view. In another example, the user may use a push gesture to select an item on the screen. In yet another example, the user may make a first and hold a display screen with both hands to turn the angle of the screen. More, fewer or different gestures may be used.

Figure 8:
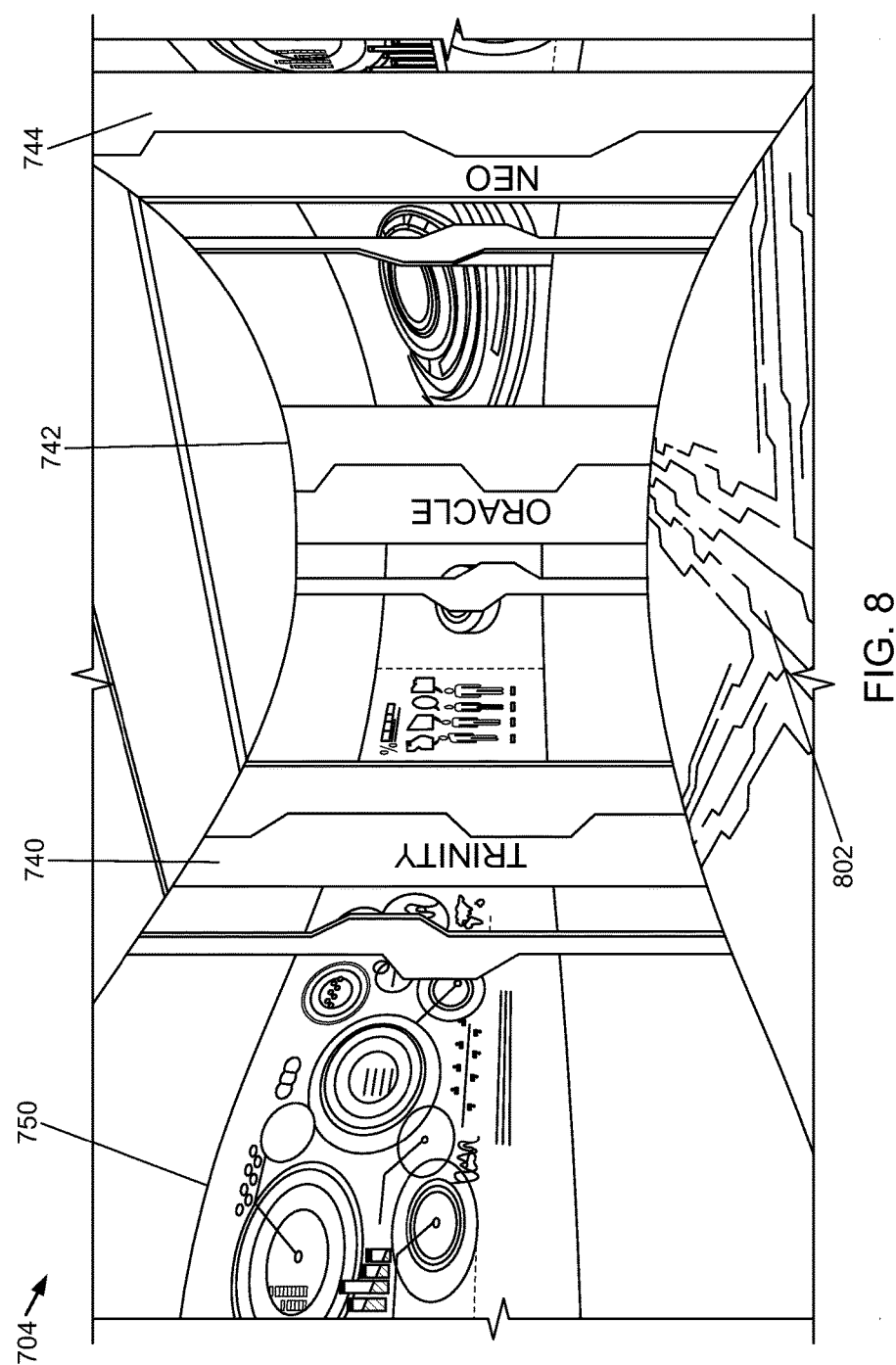
FIG. 8 shows an example social area of the experience center facility of FIG. 7.

FIG. 8 shows an example social area 746. The example social area 746 includes a projection screen 750 and example doors 740, 742 and 744. In addition, the example social area 746 includes floor LEDs 802. The LEDs 802 provide a path to each of doors 740, 742 and 744. When it is time for participants to enter a zone, the LEDs 802 light in a manner that provides a path to the zone.

In one implementation, the floor lighting may comprise strips of light emitting diodes (LEDs). The strips of LEDs are embedded on the floor of social area 746. In another implementation, interactive floor lighting may be used. With interactive floor lighting, the floor of social area 746 illuminates in a particular pattern to lead the participants to the assigned zone.

Figure 9:
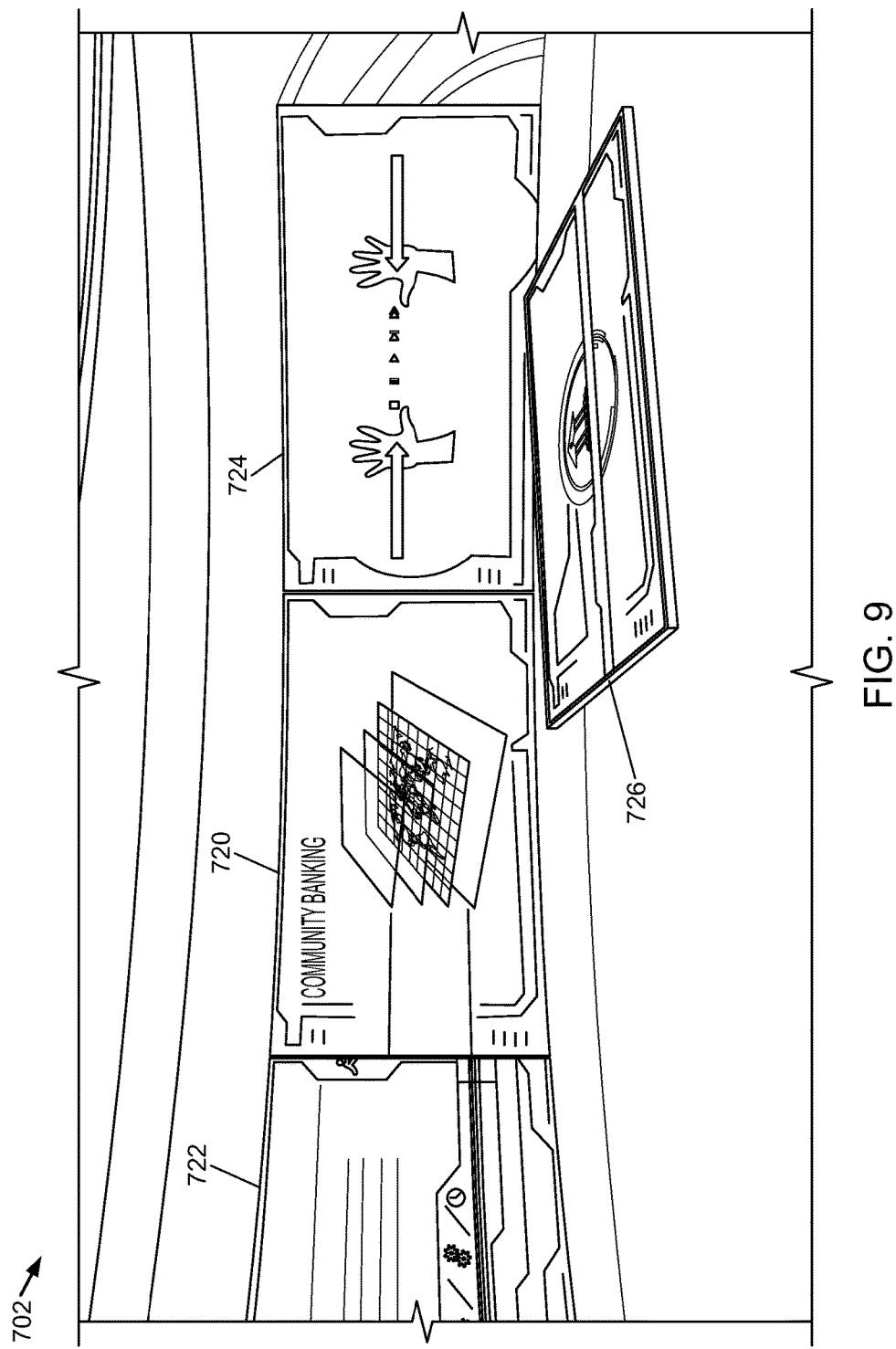
FIG. 9 shows an example zone of the experience center facility of FIG. 7.

FIG. 9 shows an example zone 702. The example zone 702 includes projection screens 722 and 724, interactive display screen 720 and interactive surface computer 726. As shown in FIG. 9, interactive surface computer 726 comprises a large touch screen on which images may be displayed and on which participant commands may be entered.

Figure 10:
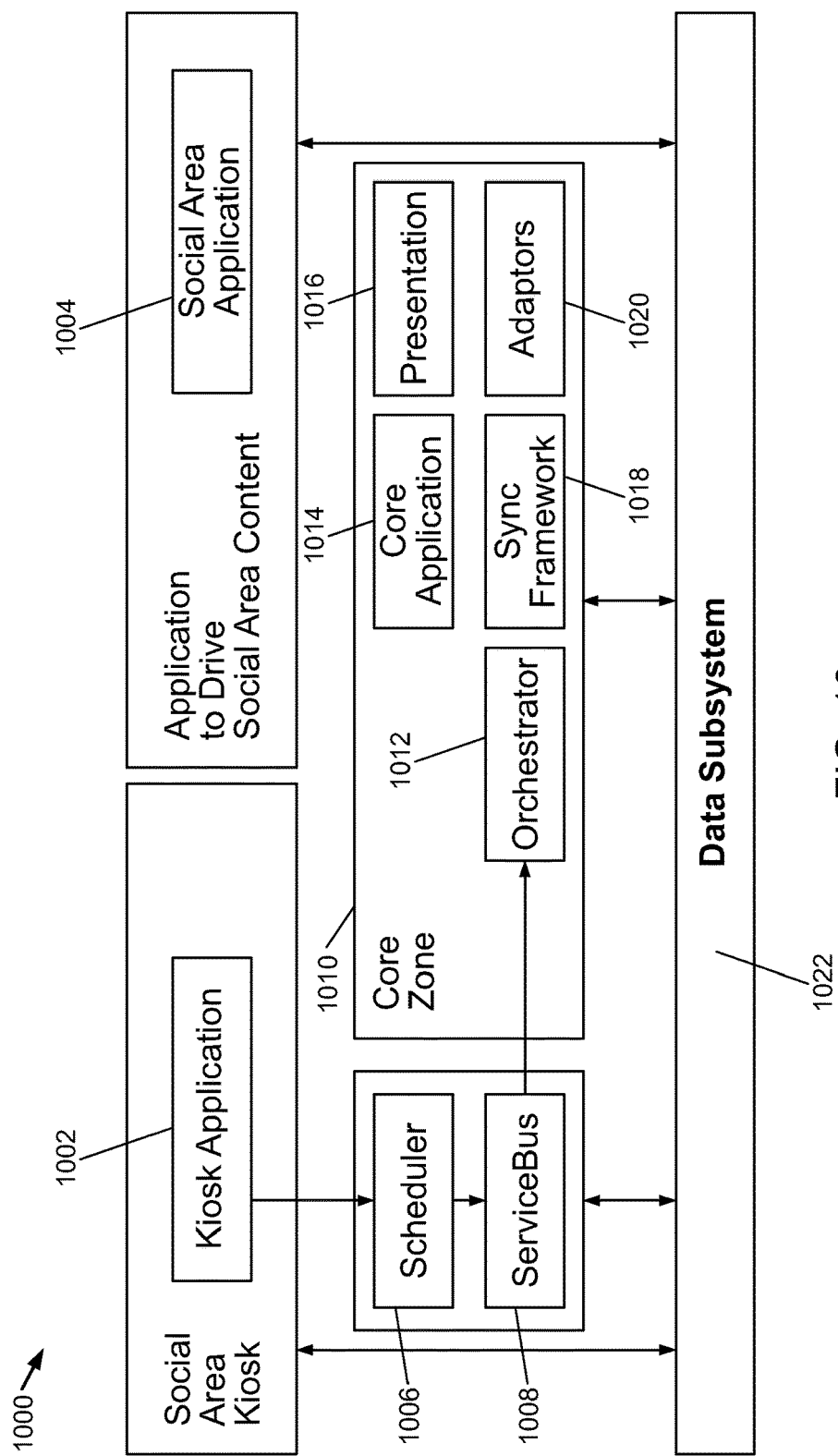
FIG. 10 shows example components of the experience center facility of FIG. 7.

FIG. 10 shows example components 1000 of the experience center facility 102. The example components 1000 include a kiosk application 1002, a social area application 1004, a scheduler 1006, a service bus 1008, a core zone 1010, and a data subsystem 1022. In example implementations, some or all of the components 1000 are part of the experience center control module 302 discussed earlier herein.

The kiosk application 1002 permits a participant to register and check-in to the experience center facility 102. The kiosk application 1002 and the kiosk 748 also provides a user with a catalog of available experience center modules and top rated experiences.

The kiosk application 1002 includes a scheduling database to register a user for a particular experience center workflow module based on available time slots. Registered users are scheduled sequentially to enter the appropriate experience center zone. The kiosk application 1002 ensures that a registered user enters the correct zone where the user's workflow module is populated.

Registration is typically a two-phase process. The kiosk application 1002 is typically used in the social area of the experience center during a second phase of registration. A first phase of registration typically occurs when a user applies for participation, for example from a desktop or laptop computer at the home or business of the participant. At the completion of the first phase, a time slot in the experience center facility 102 is confirmed for the participant. The second phase of registration occurs when the participant arrives at the experience center facility 102. The participant completes registration and check-in on a kiosk 748 in the social area 746 of the experience center facility 102. The kiosk 748 is typically a touch screen personal computer.

In an example implementation, access to the experience center is controlled via a two-step authentication process. In a first step, the user swipes an access card in a card reader at the experience center facility 102. The access card is typically provided to the user by the user's company. In a second step, the user enters a 4-digit security code. The 4-digit security code may be provided to the user in one of several ways. In one implementation, the 4-digit security code is generated using an algorithm and displayed on a screen of the kiosk 748. In another implementation, the user receives a text message containing 4-digit security code. The text message is typically received on the user's mobile telephone. Other ways for the user to receive the 4-digit security code are possible. Upon a successful completion of the swiping of the access card and the entry of the 4-digit security code, a "LOGIN SUCCESS" or similar message is displayed on the kiosk 740. Security codes containing more or fewer than 4 digits are possible.

The social area application 1004 is a set of one or more software applications that render content to projection screens 750, 752 in social area 746. The content provides informative information to participants while the participants are waiting in the experience center facility 102. The social area application 1004 may also activate lighting and audio controls in the social area 746 to enhance the mood of the participants while the participants are waiting in social area 746.

The scheduler 1006 manages schedules for the experience center facility 102. The scheduler 1006 receives participant scheduling information from the kiosk application 1002. The scheduling information includes participant registration and check-in information. The scheduler 1006 confirms the scheduling information and checks the participant into the experience center facility 102. The scheduler also transmits the scheduling information to server computer 708 via service bus 1008 and data subsystem 1022. The service bus 1008 provides an interface between the scheduler 1006 and the data subsystem 1022 and also between the core zone 1010 and the data subsystem 1022. The data subsystem 1022 provides an interface to base station computers 728, 738, 718, to server computer 708, to business process repository module 304 and to knowledge repository module 308.

The core zone 1010 includes an orchestrator 1012, a core application 1014, a presentation module 1016, a sync framework 1018 and adapters 1020.

The orchestrator 1012 orchestrates activities in a core zone, for example zone 702, 704 or 706. Orchestration may include, for example, fetching workflow content and starting core application 1014.

The core application 1014 comprises software that implements the interactive workflows, discussed earlier herein, in core zones 702, 704 and 706. The core application 1014 also comprises a virtual assistant component and a dashboard component. The virtual assistant component provides help functionality to the participants. Typically, the virtual assistant component runs in the background and is invoked when a participant requests help. For example, the virtual assistant may be invoked if the participant is not sure how to proceed in an aspect of a workflow. For example, the virtual assistant may be invoked when the participant wants to transfer funds to a beneficiary using online banking and the participant does not know how to register the beneficiary on online banking. The dashboard component provides information to the participant relating to the participant's experience at the experience center facility 102. For example, the dashboard may display an amount of time the participant has spent at the experience center facility 102 or the dashboard may show workflows that the participant has completed or is currently working on.

The presentation module 1016 includes functionality for rendering content on projection screens 722, 724, 732, 734, 716 and 712. The sync framework 1018 synchronizes content between data repositories, for example business process repository module 304 and knowledge repository module 308, and core application 1014. The adapters 1020 include motion sensors such as the Kinect® game console.

Figure 11:
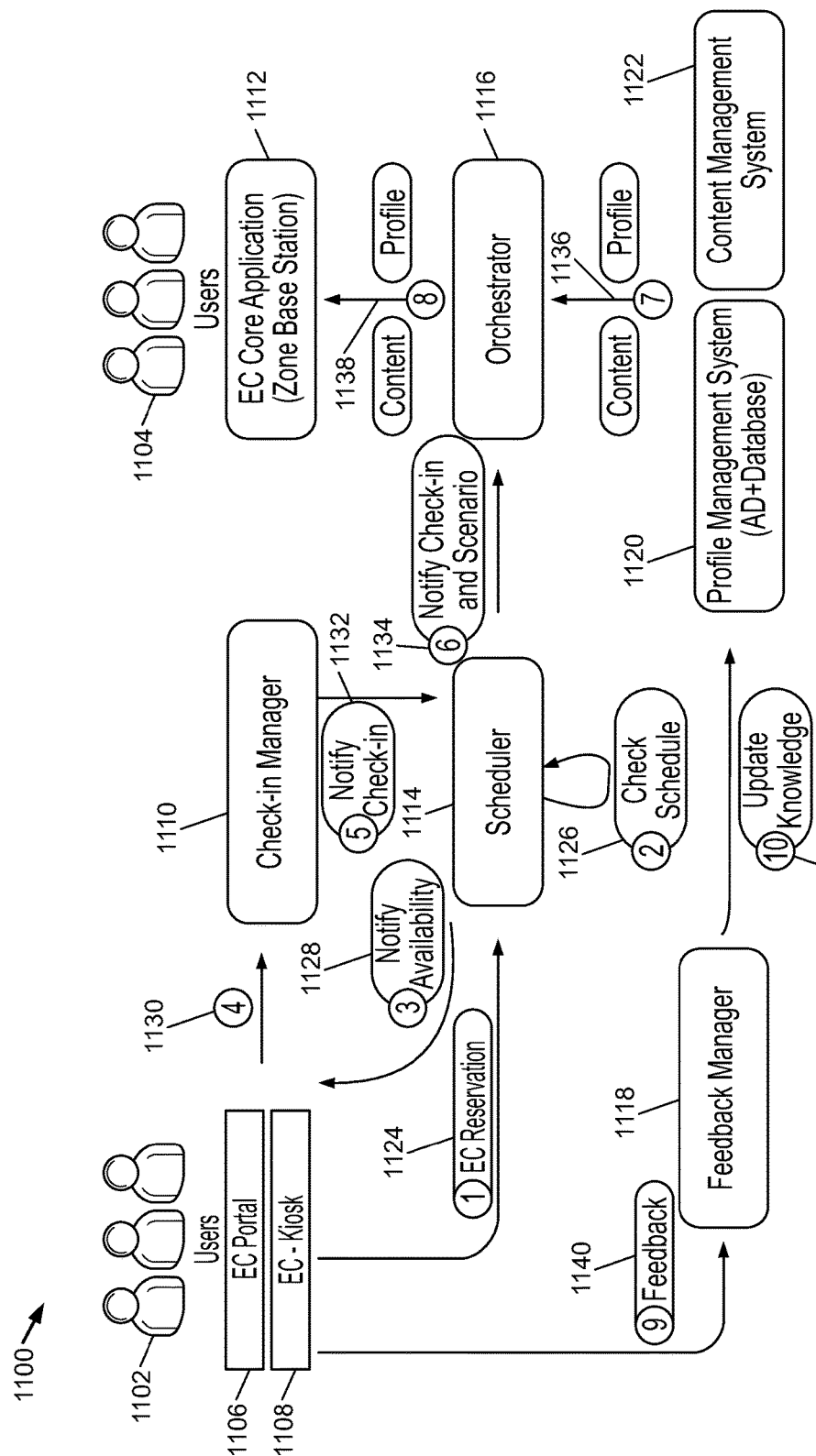
FIG. 11 shows an example life cycle diagram for a user at the experience center facility of FIG. 7.

FIG. 11 shows an example life cycle diagram 1100 for a user 1102 at the experience center facility 102. The user 1102 first requests a reservation at the experience center facility 102. In some implementations, the user 1102 may request the reservation from a location external to the experience center facility 102, for example from a desktop computer, laptop computer or mobile device. In other implementations, as shown in FIG. 11, the user 1102 requests the reservation from a portal 1106 or kiosk 1108 in the experience center facility 102. The portal 1106 or kiosk 1108 is typically located in social area 746.

As shown in FIG. 11, a reservation request 1124 is sent from portal 1106 or kiosk 1108 to scheduler 1114. The reservation request 1124 includes information about the user, such as the user's job title, work experience, and previous, if any, visits to the experience center facility 102. At operation 1126, the scheduler 1114 checks availability of the experience center facility 102 for the user 1102. When a determination is made that the experience center facility 102 is available, the scheduler 1114 registers the user 1102 at the experience center facility 102. At operation 1128, scheduler 1114 sends a notification email to the user 1102. The notification email indicates a date and a time that the user has been scheduled.

At operation 1130, user 1102 checks-in to the experience center facility 102 via portal 1106 or kiosk 1108. The check-in manager 1110 validates the check-in details. At operation 1132, the check-in manager 1110 notifies scheduler 1114 of a check-in corresponding to a reservation. At operation 1134, the scheduler 1114 validates the schedule and notifies the orchestrator 1116 to obtain content corresponding to a profile for the user 1102.

The orchestrator 1116 obtains the profile for the user 1102 from the profile management system 1120. As shown in FIG. 11, the profile management system 1120 is part of an Active Directory® database. Active Directory® is a directory service from Microsoft Corporation of Redmond, Wash.

At operation 1136, the orchestrator 1116 re-validates a content authorization based on the profile for the user 1102 and obtains workflow content corresponding to the profile for the user 1102 from content management system 1122. As warranted, the orchestrator 1116 also notifies user 1102 of his/her time limits and a need to end the current experience center facility 102 experience.

At operation 1138, the orchestrator 1116 launches an experience center core application 1112 for user 1102 on a zone base station computer. For this life cycle, the zone base station computer comprises base station computer 728 for zone 702, base station computer 738 for zone 704 or base station computer 718 for zone 706. The experience center core application 1112 comprises a workflow application assigned for user 1102.

At operation 1140, after all workflow applications for user 1102 are completed and the experience for the user 1102 ends, user 1102 at kiosk 1108 provides feedback to feedback manager 1118. At operation 1142, the profile management system 1120 is updated with the feedback from user 1102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for implementing an interactive banking experience, the method comprising:
on an electronic computing device, receiving a request for access authentication for a user of an interactive banking center;
determining a profile for the user based upon the access authentication, the profile designating access rights for the interactive banking center;
initiating a workflow in the interactive banking center, the workflow corresponding to the profile of the user or driven by preferences of the user, the workflow being one of a plurality of workflows used in the interactive banking center, each of the plurality of workflows being associated with a combination of lighting and images in a facility for housing the interactive banking center;
activating lighting and images corresponding to the workflow; displaying an interactive image of a participant in the workflow; initiating a dialog between the participant and the user; receiving responses from the user; and activating steps in the workflow based upon the responses.

2. The method of claim 1, wherein at least some of the responses are verbal responses.

3. The method of claim 1, wherein at least some of the responses are gestures.

4. The method of claim 1, wherein at least some of the responses include data.

5. The method of claim 1, further comprising stopping the workflow based upon a response.

6. The method of claim 5, further comprising displaying images of data flow during the workflow when the workflow is stopped.

7. The method of claim 5, further comprising displaying an architecture of the workflow when the workflow is stopped.

8. The method of claim 5, further comprising:
receiving changes to the workflow when the workflow is stopped; and
incorporating the changes into the workflow.

9. The method of claim 1, further comprising organizing the steps in the workflow in hierarchical levels.

10. The method of claim 9, wherein the workflow is initiated at a level corresponding to an experience level of the user.

11. The method of claim 1, wherein the workflow corresponds to originating a mortgage and the images simulate a mortgage company office.

12. The method of claim 1, wherein the workflow corresponds to opening a bank account and the images simulate a bank branch.

13. A method for implementing an interactive banking experience in a facility for housing an interactive banking center, the method comprising:
on a first electronic computing device, receiving a request for access authentication for a user of the interactive banking center;
determining a profile for the user based upon the access authentication, the profile designating access rights for the interactive banking center;
determining from the profile that the user is a bank teller trainee;
initiating a workflow in the interactive banking center, the workflow corresponding to a training session for a bank teller;
activating lighting and images corresponding to a teller's station; displaying an interactive image of a bank customer in the workflow; initiating a dialog between the bank customer and the user; receiving responses from the bank customer; and activating steps in the workflow based upon the responses.

14. The method of claim 13, further comprising receiving verbal responses from the bank customer.

15. The method of claim 13, further comprising receiving gesture responses from the bank customer.

16. The method of claim 13, wherein after one of the responses is received, stopping the workflow.

17. The method of claim 16, wherein after the workflow is stopped, displaying images of data flow during the workflow.

18. The method of claim 16, further comprising displaying an architecture of the workflow when the workflow is stopped.

19. The method of claim 16, further comprising:
receiving changes to the workflow when the workflow is stopped; and
incorporating the changes into the workflow.

20. A method for implementing an interactive banking experience in a facility for housing an interactive banking center, the method comprising:
on an electronic computing device, receiving a request for access authentication for a user of the interactive banking center;
determining a profile for the user based upon an access authentication of the user to the interactive banking center, the profile designating access rights for the interactive banking center;
initiating a workflow in the interactive banking center, the workflow corresponding to the profile of the user, the workflow comprising a plurality of steps, the steps being organized in hierarchical levels;
activating lighting and images corresponding to the workflow;
activating a step of the workflow corresponding to an experience level of the user, the experience level being determined from the profile for the user;
displaying an interactive image of a participant in the workflow; initiating a dialog between the participant and the user;
receiving responses from the user, the responses including one or more of verbal responses, gestures and data;
activating steps in the workflow based upon the responses;
stopping the workflow based upon a response;
displaying images of data flow during the workflow when the workflow is stopped; and displaying an architecture of the workflow when the workflow is stopped, the architecture including one or more of application screens, processes, process flow, hardware and network configuration.

* * * * *